United States Patent
Bürkert et al.

(10) Patent No.: US 11,397,018 B2
(45) Date of Patent: Jul. 26, 2022

(54) WIRELESS TRANSMISSION

(71) Applicant: ebm-papst Mulfingen GmbH & Co. KG, Mulfingen (DE)

(72) Inventors: Martin Bürkert, Dörzbach-Hohebach (DE); Helmut Lipp, Dörzbach-Hohebach (DE); Thomas Sauer, Bad Mergentheim (DE); Günter Haas, Mulfingen (DE); Markus Humm, Weißbach (DE); Marco Weckert, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 230 days.

(21) Appl. No.: 16/620,204

(22) PCT Filed: Jun. 13, 2018

(86) PCT No.: PCT/EP2018/065705
§ 371 (c)(1),
(2) Date: Mar. 2, 2020

(87) PCT Pub. No.: WO2019/020269
PCT Pub. Date: Jan. 31, 2019

(65) Prior Publication Data
US 2021/0055013 A1   Feb. 25, 2021

(30) Foreign Application Priority Data
Jul. 28, 2017 (DE) .................. 102017117130.4

(51) Int. Cl.
*F24F 11/56* (2018.01)
*H02K 11/35* (2016.01)
(Continued)

(52) U.S. Cl.
CPC .............. *F24F 11/56* (2018.01); *F24F 11/54* (2018.01); *G08C 17/02* (2013.01); *H02K 5/225* (2013.01); *H02K 11/35* (2016.01); *G08C 2201/42* (2013.01)

(58) Field of Classification Search
CPC ........... F24F 11/54; F24F 11/56; H02K 11/35; H02K 5/225; G08C 17/02; G08C 2201/42
See application file for complete search history.

(56) References Cited

U.S. PATENT DOCUMENTS 10,880,018 B1 * 12/2020 Bolotski .................. B25J 19/06
2002/0090506 A1 * 7/2002 Protzner .............. H05K 9/0041
428/334
(Continued)

FOREIGN PATENT DOCUMENTS

EP      2 881 676 A1    6/2015
JP      2002290416 A   10/2002
(Continued)

OTHER PUBLICATIONS

International Search Report and Written Opinion dated Aug. 21, 2018.
European Office Action dated Apr. 19, 2022.

*Primary Examiner* — Gary Collins
(74) *Attorney, Agent, or Firm* — Dickinson Wright PLLC

(57) ABSTRACT

The disclosure relates to an assembly composed of two or more electric drives, each of which is provided with a housing that is preferably closed all around; a transceiver or radio transmitter inside the housing of each electric drive is configured for wireless data communication with a master controller; for this purpose, a properly mounted transmission opening is provided in each housing in order for data to be transmitted and received through the transmission opening.

13 Claims, 1 Drawing Sheet

(51) Int. Cl.
*F24F 11/54* (2018.01)
*G08C 17/02* (2006.01)
*H02K 5/22* (2006.01)

(56) References Cited

U.S. PATENT DOCUMENTS

| | | | |
|---|---|---|---|
| 2008/0159364 A1* | 7/2008 | Rofougaran | H01Q 1/2283 |
| | | | 375/219 |
| 2011/0156640 A1* | 6/2011 | Moshfeghi | H04B 1/3838 |
| | | | 320/108 |
| 2011/0228779 A1* | 9/2011 | Goergen | H04L 49/40 |
| | | | 370/392 |
| 2012/0214415 A1* | 8/2012 | Harvey | H05K 7/1425 |
| | | | 455/41.2 |
| 2014/0210321 A1 | 7/2014 | Dixon et al. | |
| 2017/0062937 A1 | 3/2017 | Ganchrow et al. | |
| 2018/0132183 A1* | 5/2018 | Gattu | G05B 15/02 |
| 2018/0266719 A1* | 9/2018 | Kim | F24F 11/56 |
| 2018/0356115 A1* | 12/2018 | Koizumi | F24F 11/56 |

FOREIGN PATENT DOCUMENTS

| | | |
|---|---|---|
| KR | 20090041912 | 4/2009 |
| KR | 20170078824 A | 7/2017 |
| WO | WO2015/038362 A1 | 3/2015 |
| WO | 2017061962 | 4/2017 |

\* cited by examiner

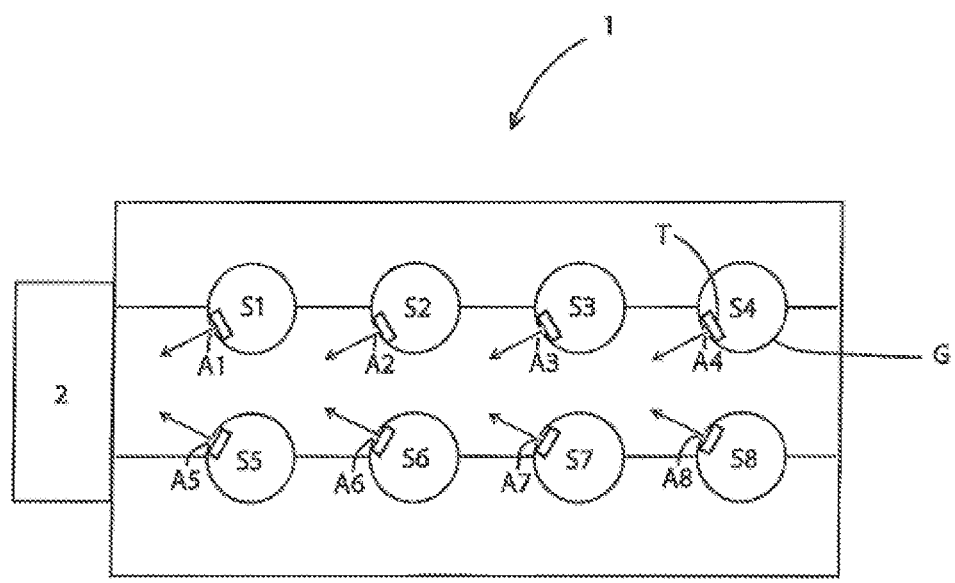

WIRELESS TRANSMISSION

RELATED APPLICATIONS

This application claims priority to German Patent Application No. 10 2017 117 130.4, filed Jul. 28, 2017, and PCT/EP2018/065705, filed Jun. 13, 2018, the entire contents of which are incorporated herein by reference in their entirety.

FIELD

The disclosure relates to a network composed of two or more electric drives which can communicate wirelessly with each other or a network composed of two or more devices, each having an electric drive.

BACKGROUND

When operating air conditioning systems, ventilation systems and the like, for example, it is common to use a corresponding number of electric motors, the operating modes of which must be controlled depending on the desired operating condition, and therefore the operating conditions of all electric drives specified and required for the process are needed. Thus, there is a need for these electric drives operating as slave units within a network to communicate with a master controller, on the one hand, i.e. with the master unit, for example, and partly also with each other.

Typically, electric drives (slave units) within the network are interconnected via bus lines, so a typical wired communication network must be established to ensure communication with the slave units. This necessitates a lot of wiring and installation work depending on the number of slave units and their location within the network. This is particularly challenging in existing buildings or systems, as additional cable connections and lines may entail considerable costs during installation.

Hence, there is a need to reduce wiring and facilitate operation. However, designing electric drives as independent units which are ready for installation such that they could be wirelessly integrated into a network with little effort has not yet been successfully achieved in the prior art. In particular, the metallic housings of drive units pose the problem of acting like a Faraday cage, thus interfering with any radio connection. However, reliable communication is required to operate systems.

There is also a need not to provide electric drives with an external interface having a data communications transceiver connected thereto or a separate radio component outside the housing.

However, due to EMC requirements and the strong housing shield produced by closed housings and enclosures, interconnecting electric drives of, e.g., fans through wireless communication within a network has not yet been accomplished in a satisfactory manner.

BRIEF SUMMARY

Having this in mind, an object of the present disclosure is to at least partially reduce the aforementioned shortcomings and provide a solution enabling a cost-effective installation and reliable operation of a plurality of electric drives within a network.

This object is achieved by a network composed of electric drives according to the features of claim 1.

The basic idea of the present disclosure is to provide the electric drives as slave units having an integrated transceiver, or alternatively a radio transmitter, for wireless transmission of operating parameters or data and to provide each electric drive housing with a suitable transmission opening such that an undisturbed communication operation, i.e. having a particularly strong signal, is possible.

Thus, according to the disclosure, electric drives are provided, having a housing closed all around or an enclosure surrounding the drive on all sides, wherein a transceiver or radio transmitter is provided within the housing or enclosure, which is adapted to receive or transmit data wirelessly from or to a master or master controller.

For this purpose, according to the disclosure, a properly mounted transmission opening is provided within the housing to transmit and receive data therethrough. Preferably, two or more of such transmission openings may also be provided within the housing of the electric drive. If the electric drive is not provided with an enclosing housing at all, it is also not necessary to mount a properly configured transmission opening in a housing thus not closed.

In a preferred embodiment of the disclosure, an electric drive or an arrangement of such electric drives is proposed in which the housing of the electric drives is configured as a shielded housing, preferably as a metal housing, so that EMC shielding is implemented, e.g. according to normative standards.

Advantageously, the above-mentioned properly arranged transmission openings within the housing are each mounted or arranged as a directed opening in a certain position and orientation relative to the transceiver and preferably also to the master. Thus, in a preferred design of the disclosure, the cable bushings can be designed such that, in addition to the cable bushing, a wireless data transmission therethrough is possible at the same time if the transceiver is arranged in a suitable position behind the cable bushing. For this purpose, as an example, sealing materials can be employed which are transmissive for the data transmission used.

Alternatively, data transmission can be implemented by using an at least partially non-metallic terminal box to enable information transfer without "opening" the housing. In line with the terminology of the present disclosure, the cover of the non-metallic terminal box thus represents a proper data-transmissive transmission opening within the housing.

In another alternative design of the disclosure, the transmission openings within the housing are configured as a non-metallic housing section, the housing wall of the housing being provided with an opening, for example, sealed with a material transmissive for radio waves, so that the housing maintains its function with respect to environmental impacts such as dirt, dust, liquid and also against accidental contact with live parts (e.g. an IP67 housing), but still has a transmission opening for wireless communication.

Also preferred is a design in which the input or output means is oriented towards a control unit having an integrated radio module and one in which the input and output means of the terminal box are oriented towards the control unit for optimum radio connection. This means that the orientation of the electric drives or transmission openings must be such that they point towards the master in the direction of the radio link. Therefore, the openings for the respective communication signal transmission links are oriented in a transmission-based manner, resulting in interference (such as reflections) caused by metallic surroundings in the transmission of data being prevented or at least minimized.

It is particularly advantageous if the wireless transmission technology is implemented by means of standard transmission methods such as Wi-Fi, Bluetooth, ZigBee, LoRaWan, GSM, UMTS, LTE, infrared or the like, so that the transceivers are configured for such technology.

Advantageously, the solution of the disclosure can be used for wireless networking of EC fans in the field of refrigeration and air-conditioning technology, preferably in heat exchangers having more than two fans. It is even more preferable for the integrated radio module or transceiver to be integrated on the motor circuit board or in the terminal box of the motor, further advantageously behind, even more advantageously directly and immediately behind a transmission opening.

In a particularly advantageous design, in an air-conditioning system having heat exchangers, the electric drives are configured as slave units and the control unit of the heat exchanger is configured as the master having an integrated radio module.

Furthermore, according to the disclosure, it is intended that the access code for changing parameters of the electric drives is assigned per serial number of the slave unit, resulting in a simplified handling of access data. It is also advantageous to store a unique access code in the master (control unit) for servicing.

BRIEF DESCRIPTION OF THE DRAWINGS

Other advantageous further developments of the disclosure are characterized in the dependent claims or are explained in detail below along with the description of the preferred embodiments of the disclosure with reference to the FIGURES.

In the drawings:

FIG. 1 shows a schematic view of the assembly according to the disclosure.

DETAILED DESCRIPTION

FIG. 1 exemplifies and schematically shows an assembly 1 composed of eight electric drives S1, . . . , S8, each of which is provided with a housing G that is closed all around, wherein a transceiver or radio transmitter T is provided inside housing G for each electric drive S1, . . . , S8.

Further, a master controller 2 is provided which, along with electric drives S1, . . . , S8 configured as slave units, forms a master/slave system for wireless data communication with master controller 2.

For this purpose, a properly mounted transmission opening A1, . . . , A8 is provided in respective housing G of electric drives S1, . . . , S8 to transmit and receive data through the transmission opening.

The present exemplary embodiment represents a refrigeration or air-conditioning system in which housings G of electric drives S1, . . . , S8 are configured as shielded housings made of a metal material, thus creating an EMC shield for electric drives S1, . . . , S8.

Here, respective transceivers or radio transmitters T are positioned immediately behind respective transmission opening A1, . . . , A8 and oriented towards master 2, represented by arrows in FIG. 1.

According to the disclosure, a number of variations are conceivable which make use of the illustrated solution even with fundamentally different implementations, such as adaptation of the transmission technology to the system configuration, implemented by means of a common standard transmission method, such as Wi-Fi, Bluetooth, ZigBee, LoRaWan, GSM, UMTS, LTE, infrared or the like, so that each transceiver T is configured for this technology.

The invention claimed is:

1. An assembly comprising two or more electric drives, each of which is provided with a housing, wherein a transceiver or radio transmitter is provided inside the housing of each electric drive, wherein the assembly is configured for wireless data communication with a master controller, for which purpose a properly mounted transmission opening is provided in each housing in order for data to be transmitted and received through the transmission opening, wherein the respective transceivers are arranged on a motor circuit board directly behind the respective transmission openings of the slave units such that they are oriented on the circuit board towards the master.

2. The assembly according to claim 1, wherein two or more transmission openings are provided within each housing of the respective electric drives.

3. The assembly according to claim 1, wherein the housing of the electric drives is configured as a shielded housing resulting in EMC shielding at the same time.

4. The assembly according to claim 3, wherein housing of the electric drives is configured as a non-metallic housing.

5. The assembly according to claim 1, wherein the transmission opening(s) seal(s) housing against the ingress of dust and dirt by means of a non-metallic housing seal, but remain(s) transmissive for data transmission.

6. The assembly according to claim 1, wherein the respective transceivers or radio transmitters are integrated on the motor circuit board of the electric drive, in particular directly and immediately behind a transmission opening.

7. The assembly according to claim 1, wherein the transmission openings form a cable bushing within housing at the same time.

8. The assembly according to claim 1, wherein the transceiver(s) or radio transmitter(s) is/are accommodated in a non-metallic terminal box of the electric drives.

9. The assembly according to claim 1, wherein the wireless transmission technology is implemented by means of standard transmission methods including at least one of Wi-Fi, Bluetooth, ZigBee, LoRaWan, GSM, UMTS, LTE, and infrared, and the transceivers are configured for such transmission method.

10. A refrigeration or air-conditioning system, comprising an assembly according to claim 1, configured as a wirelessly communicating master/slave system, wherein the controller is configured as a master and the electric drives are configured as slave units.

11. The refrigeration or air-conditioning system according to claim 10, wherein the transmission openings of the slave units are oriented towards the master.

12. The refrigeration or air-conditioning system according to claim 10, wherein, for changing parameters of the electric drives, an access code is assigned per serial number of the respective slave unit, and in that the master has its own access code.

13. The assembly according to claim 1, wherein housing is closed all around.

* * * * *